(12) United States Patent
Hottelier et al.

(10) Patent No.: US 12,511,266 B2
(45) Date of Patent: Dec. 30, 2025

(54) MANAGED TABLES FOR DATA LAKES

(71) Applicant: Google LLC, Mountain View, CA (US)

(72) Inventors: Thibaud Hottelier, Seattle, WA (US); Anoop Kochummen Johnson, Fremont, CA (US); Justin Levandoski, Seattle, WA (US); Gaurav Saxena, Bothell, WA (US); Yuri Volobuev, Walnut Creek, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/389,331

(22) Filed: Nov. 14, 2023

(65) Prior Publication Data

US 2025/0077477 A1    Mar. 6, 2025

Related U.S. Application Data

(60) Provisional application No. 63/535,811, filed on Aug. 31, 2023.

(51) Int. Cl.

| | | |
|---|---|---|
| *G06F 7/00* | (2006.01) | |
| *G06F 12/02* | (2006.01) | |
| *G06F 16/18* | (2019.01) | |
| *G06F 16/22* | (2019.01) | |
| *G06F 16/23* | (2019.01) | |
| *G06F 16/28* | (2019.01) | |
| *G06F 17/00* | (2019.01) | |

(52) U.S. Cl.
CPC ...... *G06F 16/1805* (2019.01); *G06F 12/0253* (2013.01); *G06F 16/221* (2019.01); *G06F 16/2358* (2019.01); *G06F 16/2365* (2019.01); *G06F 16/2379* (2019.01); *G06F 16/283* (2019.01)

(58) Field of Classification Search
None
See application file for complete search history.

(56) References Cited

U.S. PATENT DOCUMENTS

| | | | |
|---|---|---|---|
| 7,792,822 B2* | 9/2010 | Galindo-Legaria | ................ G06F 16/2452 707/715 |
| 11,455,290 B1 | 9/2022 | Brahmadesam et al. | |
| 2014/0279838 A1 | 9/2014 | Tsirogiannis et al. | |
| 2016/0147859 A1 | 5/2016 | Lee et al. | |
| 2017/0116237 A1* | 4/2017 | Zhang | ................ G06F 16/221 |
| 2018/0081591 A1* | 3/2018 | Maheshwari | ....... G06F 12/1045 |

(Continued)

OTHER PUBLICATIONS

Edara et al. Big Metadata: When Metadata is Big Data. 2021. PVLDB, 14(12): pp. 3083-3095.

(Continued)

*Primary Examiner* — Tuan A Pham
(74) *Attorney, Agent, or Firm* — Lerner David LLP

(57) ABSTRACT

Aspects of the disclosure are directed to merging data lake openness with scalable metadata for managed tables in a cloud database platform, allowing for atomicity, consistency, isolation, and durability (ACID) transactions, performant data manipulation language (DML), higher throughput stream ingestion, data consistency, schema evolution, time travel, clustering, fine-grained security, and/or automatic storage optimization. Table data is stored in various open-source file formats in cloud storage while physical metadata of the table data is stored in a scalable metadata storage system.

17 Claims, 7 Drawing Sheets

(56) References Cited

U.S. PATENT DOCUMENTS

| | | | |
|---|---|---|---|
| 2020/0125548 A1* | 4/2020 | Shergill | G06F 16/254 |
| 2020/0364201 A1* | 11/2020 | Cseri | G06F 16/235 |
| 2021/0342067 A1* | 11/2021 | Meister | G06F 3/0688 |
| 2022/0083978 A1 | 3/2022 | Weindling | |
| 2022/0327131 A1* | 10/2022 | Akidau | G06F 16/24568 |
| 2022/0382674 A1* | 12/2022 | Wang | G06F 16/245 |
| 2023/0185688 A1 | 6/2023 | Edara et al. | |
| 2023/0409545 A1 | 12/2023 | Gupta et al. | |

OTHER PUBLICATIONS

Behm et al. Photon: A Fast Query Engine for Lakehouse Systems. Proceedings of the 26th ACM International Conference on Hybrid Systems: Computation and Control, ACMPUB27, New York, NY, USA, Jun. 10, 2022 (Jun. 10, 2022), pp. 2326-2339, DOI: 10.1145/3514221.3526054.

International Search Report and Written Opinion for International Application No. PCT/US2024/035961 dated Sep. 10, 2024. 18 pages.

* cited by examiner

MANAGED TABLES FOR DATA LAKES

CROSS-REFERENCE TO RELATED APPLICATIONS

The present application claims the benefit of the filing date of U.S. Provisional Patent Application No. 63/535,811, filed Aug. 31, 2023, the disclosure of which is hereby incorporated herein by reference.

BACKGROUND

Data lakes are increasingly built using open file formats and stored on cloud object stores due to their relatively low cost and high durability. However, interfaces provided by cloud storage systems are limited to single object mutations with no support for multi-object transactions. This creates difficulty for systems using data lake storage to achieve atomicity, consistency, isolation, and durability (ACID) transactions, snapshot consistency for reads, and strong read-after-write consistency. Further, the use of open-source table formats to alleviate this difficulty causes lower write throughput, lower query performance, higher operational overhead for infrastructure management, limited transaction support, and a weaker security model.

BRIEF SUMMARY

Aspects of the disclosure are directed to merging data lake openness with scalable metadata for managed tables in a cloud database platform, allowing for atomicity, consistency, isolation, and durability (ACID) transactions, performant data manipulation language (DML), higher throughput stream ingestion, data consistency, schema evolution, time travel, clustering, fine-grained security, and/or automatic storage optimization. Table data is stored in various open-source file formats in cloud storage while physical metadata of the table data is stored in a scalable metadata storage system.

An aspect of the disclosure provides for a method for processing queries, including: receiving, by one or more processors, a request from a query engine to write one or more data files; writing, by the one or more processors, tuples of the one or more data files to a write-optimized storage in an appendable distributed file system; converting, by the one or more processors, the tuples to a columnar format optimized for reads; storing, by the one or more processors, the one or more data files in cloud storage compatible with the query engine; and committing, by the one or more processors, the write as an addition to a table transaction log stored in the appendable distributed file system. Another aspect of the disclosure provides for a system including: one or more processors; and one or more storage devices coupled to the one or more processors and storing instructions that, when executed by the one or more processors, cause the one or more processors to perform operations according to the method for processing queries. Yet another aspect of the disclosure provides for a non-transitory computer-readable medium for storing instructions that, when executed by one or more processors, cause the one or more processors to perform operations according to the method for processing queries.

In an example, the method further includes compacting, by the one or more processors, the transaction log into columnar baselines. In another example, the columnar baselines are in a format compatible with the query engine. In yet another example, the method further includes performing, by the one or more processors, one or more maintenance tasks based on metadata in the distributed file system. In yet another example, the one or more maintenance tasks include at least one of garbage collection, file merging, file splitting, or file reclustering.

In yet another example, the method further includes: converting, by the one or more processors, the table transaction log to a format compatible with the query engine; and storing, by one or more processors, the table transaction log in the cloud storage compatible with the query engine.

In yet another example, the method further includes: exporting, by the one or more processors, the metadata in the appendable distributed file system to the cloud storage compatible with the query engine. In yet another example, the metadata exported is in a format compatible with the query engine. In yet another example, the exporting is automatically triggered in response to each addition to the table transaction log.

In yet another example, the method further includes: receiving, by one or more processors, a request from a query engine to read the one or more data files in the cloud storage; and directly reading, by the one or more processors, the one or more data files from the cloud storage. In yet another example, the method further includes: receiving, by one or more processors, a request from a query engine to read the one or more data files in the cloud storage; and reading, by the one or more processors, the one or more data files from the cloud storage through an application programming interface (API) exposing the cloud storage and the appendable distributed file system. In yet another example, reading the one or more data files through the API guarantees at least one of exactly once delivery or strong read after write semantics.

DETAILED DESCRIPTION

Figure 1:
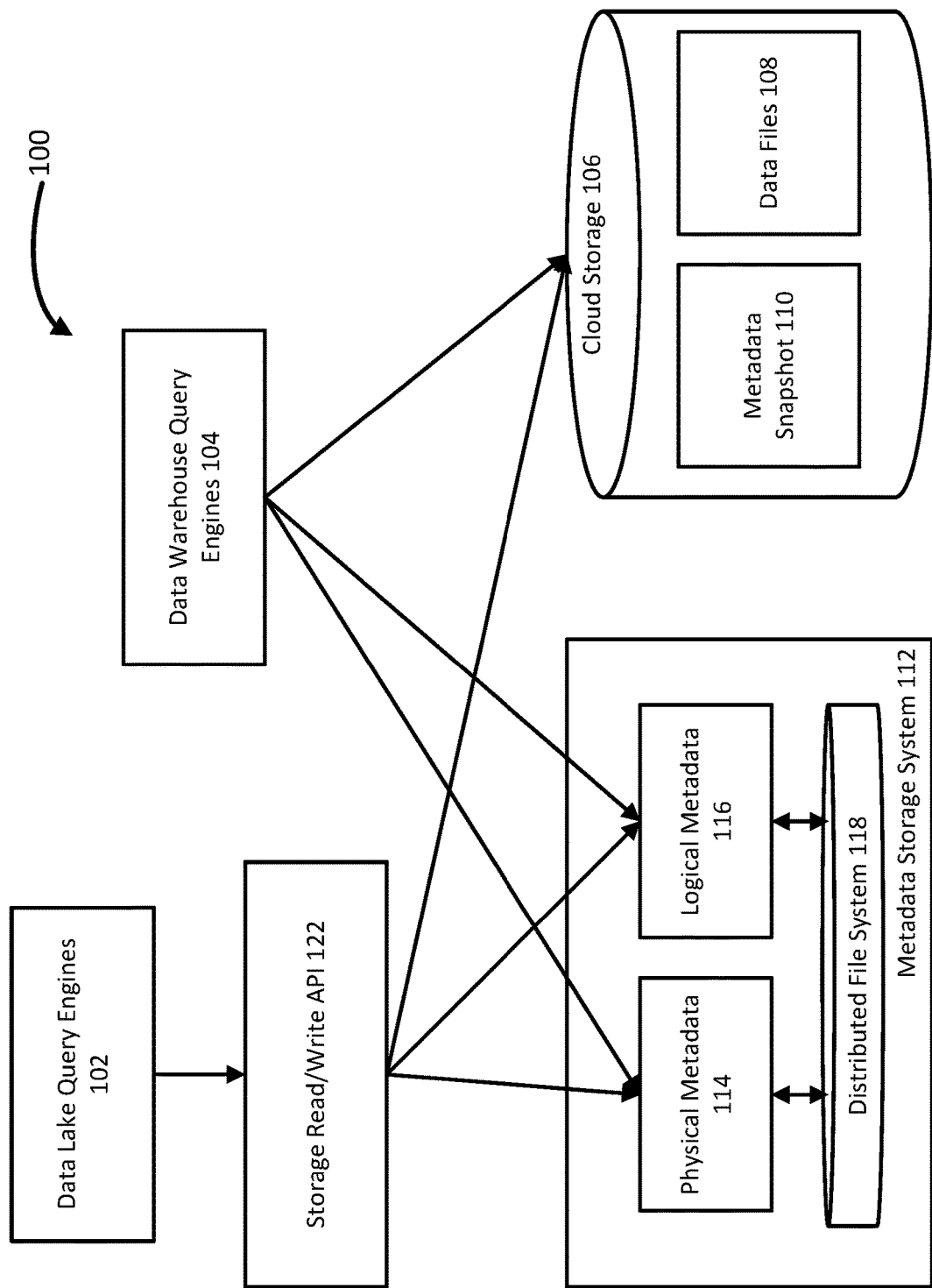
FIG. 1 depicts a block diagram of an example managed table system for a cloud storage system for data lakes and data warehouses according to aspects of the disclosure.

The technology relates generally to an approach for managed tables in a cloud database platform that can merge data lake openness with scalable metadata. The approach can allow for atomicity, consistency, isolation, and durability (ACID) transactions, performant data manipulation language (DML), higher throughput stream ingestion, data consistency, schema evolution, time travel, clustering, fine-grained security, and/or automatic storage optimization. The approach can store table data in various open-source file formats in cloud storage while storing physical metadata, e.g., file names, statistics, row-level deletion bitmaps, of the table data in a scalable metadata storage system. The separation of the physical metadata from the table data can allow for higher-volume DML and cross-table transactions.

For committing a transaction, the managed table system can write file- or row-level additions and/or deletions to an append-based transaction log in the metadata storage system. The metadata storage system can include a distributed file system that supports file appends, e.g., an appendable distributed file system, to store the append-based transaction log. The distributed file system can also support snapshots, such as the ability to atomically create a logical duplicate of a group of files, and/or renames, such as the ability to atomically rename a group of files. The distributed file system can be replicated to one or more data centers in one or more locations. The managed table system can periodically compact the append-based transaction log into read-optimized baselines to allow for improving query efficiency. The read-optimized baselines can be stored in a columnar-oriented format. For example, the managed table system can compact the append-based transaction log per minute or per hour depending on how fast the additions and/or deletions occur. The read-optimized baselines can contain column-level metadata, such as zone maps and/or bloom filters, that the managed table system can use to prune files for future queries.

The managed table system can include automated data management for continuously or periodically performing maintenance tasks on the physical metadata. As examples, the maintenance tasks can include garbage collecting files, improving storage by coalescing smaller files into larger files, and/or performing continuous or periodic background reclustering.

The managed table system can include a storage application programming interface (API) to support higher-throughput streaming ingestion from open-source query engines. The storage API can write ingested tuples to a write-optimized storage in the distributed file system. The write-optimized storage can be stored in a row-oriented format in an appendable file system, such as the distributed file system. The managed table system can periodically transactionally convert the ingested tuples in the write-optimized storage into read-optimized columnar data files in the cloud storage. For example, the managed table system can convert the ingested tuples per minute or per hour depending on how fast the tuples are ingested. Streamed tuples can be visible after a write as the table data can represent a union of the tuples stored in the cloud storage and the write-optimized storage in the distributed file system, allowing for maintaining atomicity guarantees of the conversion, even for cloud storage that does not support atomic renames or snapshots.

The managed table system can include an open metadata view to provide a live view of the metadata storage system in open-source table formats. The open metadata view can provide compatibility with external query engines that only support open-source table formats and can avoid lock-in, as clients can export the table data and metadata. The open metadata view can be materialized to the cloud storage, such as by writing the metadata view into one or more files, or accessed through open-source compatible catalog APIs in an open-source compatible metastore. The export can be automatic or requested by running a metadata export query. The export can also be incremental, building on a previously exported snapshot and writing only the differences rather than materializing the entire metadata snapshot for each export.

The open-source query engines can read table data of the managed table system by using the open metadata view to directly access files on the cloud storage. Fine-grained access control lists (ACLs) may not be enforced, as the open-source query engines have direct file access. Based on eventual consistency, recently streamed tuples still in the write-optimized storage may not be visible. Alternatively, or additionally, the open-source query engines can read the table data by reading the table data through the storage API. The storage API can enforce fine-grained ACLs and/or offer strong read consistency, regardless of whether the streamed tuple is still in the write-optimized storage.

FIG. 1 depicts a block diagram of an example managed table system 100 for a cloud storage system for data lakes and data warehouses. The managed table system 100 can be implemented on one or more computing devices in one or more locations. The managed table system 100 can include one or more data lake query engines 102 and one or more data warehouse query engines 104. Example data lake query engines 102 can include open-source engines and example data warehouse query engines 104 can include warehouse native APIs.

The managed table system 100 can further include cloud storage 106 for storing table data 108 and metadata snapshots 110 in various file formats, such as open-source file formats. The metadata snapshots 110 may refer to materializing, e.g., writing into one or more files, an open metadata view of the logical metadata 114 and/or physical metadata 116 to an object store of the cloud storage 106. The file formats can be particular to a client utilizing the managed table system 100. The managed table system 100 can also include a metadata storage system 112 for storing physical metadata 114 and/or logical metadata 116 in a distributed file system 118. Example physical metadata 114 can include file names, statistics, and/or row-level deletion bitmaps of the table data 108. Example logical metadata 116 can include schema, attributes, and/or permissions for the table data 108. The separation of the metadata, e.g., physical metadata 114 and/or logical metadata 116, from the table data 108 can allow for higher-volume DML and cross-table transactions.

The managed table system 100 can receive requests from the data lake query engines 102 and data warehouse query engines 104 to process queries. The data warehouse query engines 104 can directly access the cloud storage 106 and metadata storage system 112 for processing the queries. The data warehouse query engines 104 can further periodically perform a disaggregated shuffle to allow workers in the data warehouse query engines 104 to exchange information, such as for distributed operations like a join operation. The data lake query engines 102 can access the cloud storage 106 and metadata storage system 112 through a storage API 122, e.g., storage read/write API, for processing the queries. Alternatively, or additionally, the data lake query engines 102 can access the cloud storage 106 and metadata storage system 112 directly through an open metadata view (not shown).

Figure 2:
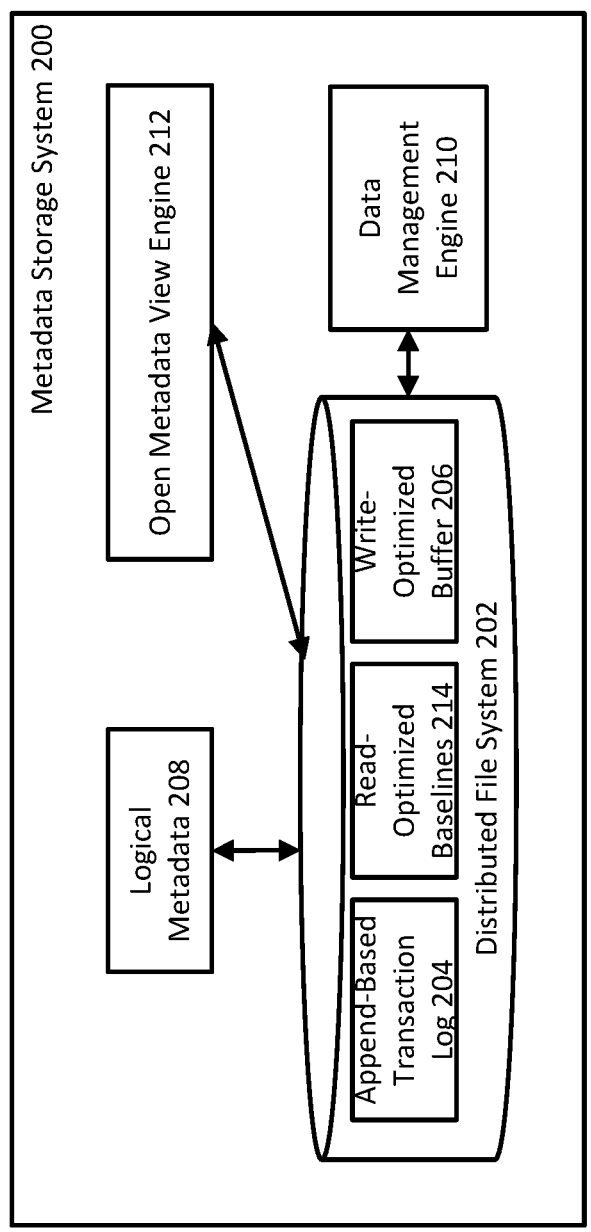
FIG. 2 depicts a block diagram of an example metadata storage system according to aspects of the disclosure.

FIG. 2 depicts a block diagram of an example metadata storage system 200. The example metadata storage system 200 can correspond to the metadata storage system 112 as depicted in FIG. 1. The metadata storage system 200 can include a distributed file system 202 for storing metadata, such as physical metadata and/or logical metadata. The distributed file system 202 can include an append-based transaction log 204 and a write-optimized storage 206 for processing transactions in response to query requests from query engines. The distributed file system 202 may further include logical metadata 208. The query engines and a storage API can commit transactions to the metadata store system 200. The metadata storage system 200 can further include a data management engine 210 for continuously or periodically performing maintenance on the metadata. The metadata storage system 200 can also include an open metadata view engine 212 for providing an exportable view of the metadata storage system 200 in various formats.

The storage API can support high-throughput streaming ingestion based on write requests received from the data lake query engines. The storage API can write ingested tuples of a write request to the write-optimized storage 206 of the distributed file system 202. To be write-optimized, the storage 206 can have a row-oriented format for storing tuples. Periodically, the data management engine 210 and/or the query engines can transactionally convert the ingested tuples in the write-optimized storage 206 to read-optimized data files for storing in the cloud storage. To be read-optimized, the data files can have a columnar-oriented format. As examples, based on how fast tuples are ingested, the storage API can transactionally convert the ingested tuples per minute, per hour, or continually. The tuples can be visible after a write as the table data can represent a union of data files stored in the cloud storage and data files stored in the write-optimized storage 206. The union can allow for maintaining atomicity guarantees of the conversion, even if the cloud storage is incompatible with atomic renames or snapshots.

To commit transactions based on requests received from the data lake query engines, the storage API can write file- or row-level additions and/or deletions to the append-based transaction log 204 of the distributed file system 202. Periodically, the storage API can compact the append-based transaction log into read-optimized baselines 214, for storing in the cloud storage. To be read-optimized, the baselines 214 can have a columnar-oriented format. As examples, based on how fast the additions and/or deletions are written, the data management engine 210 can compact the append-based transaction log 204 per minute, per hours, or continually. The read-optimized baselines 214 can contain column-level metadata that can be utilized for pruning files and/or improving query efficiency. For example, the column-level metadata can include location maps and/or bloom filters. The write-optimized storage 206, read-optimized baselines 214, and the append-based transaction log 204 of the distributed file system 200 allow for ACID transactions with higher throughput.

Based on requests received from the data lake query engines, the storage API can be utilized to read the table data. The storage API can enforce fine-grained access control lists (FGACs) using the logical metadata. The storage API can also offer strong consistency, regardless of whether the streamed tuple is in the cloud storage or still in the write-optimized storage since the table data can represent a union of data files of the cloud storage and write-optimized storage.

The open metadata view engine 212 can provide a live view of the metadata storage system 200 in various table formats, such as open-source formats. The open metadata view engine 212 can convert the metadata to various formats and export the metadata in the various formats. For example, the open metadata view engine 212 can be configured to convert and export the metadata in a particular format compatible with a client utilizing the cloud storage. The open metadata view engine 212 can export the metadata in response to a query, such as a metadata export query received from the data lake query engines, or automatically, such as in response to each addition and/or deletion to the transaction log 204. The open metadata view engine 212 allows for compatibility with data lake query engines or data warehouse query engines that may only support particular table formats, such as open-source table formats, as well as avoids lock-in of the metadata where the metadata may be stuck to a particular data warehouse or storage system. The open metadata view engine 212 can materialize the open metadata view to the cloud storage, such as by writing the metadata view into one or more files, or include a format-compatible API for accessing the metadata.

Based on requests received from the data lake query engines, the open metadata view engine 212 can be utilized to read the table data. The open metadata view engine 212 can directly access files in the cloud storage. Since the data lake query engines may have direct file access through the open metadata view engine 212, FGACs may not be enforced. Further, the open metadata view engine 212 can offer eventual consistency, so recently streamed tuples still in the write-optimized storage may not be visible.

The data management engine 210 can perform continuous or periodic, e.g., per minute or per hour, maintenance tasks on the distributed file system, such as on the physical metadata and/or logical metadata. Maintenance tasks can include garbage collection, file coalescing, and/or reclustering, as examples. For instance, the data management engine 210 can delete files from the distributed file system that contain data that has already been deleted from the cloud storage, e.g., garbage collection of tuples stored in the write-optimized buffer 206. As another example, the data management engine 210 can merge smaller files into larger files and/or split larger files into smaller files, such as for optimizing file sizes based on performance, compute capacity, and/or utilizing parallelism. For instance, streaming a smaller amount of data tends to produce smaller files which can then be combined and clustered to maintain performance. As yet another example, the data management engine 210 can perform background reclustering.

Figure 3:
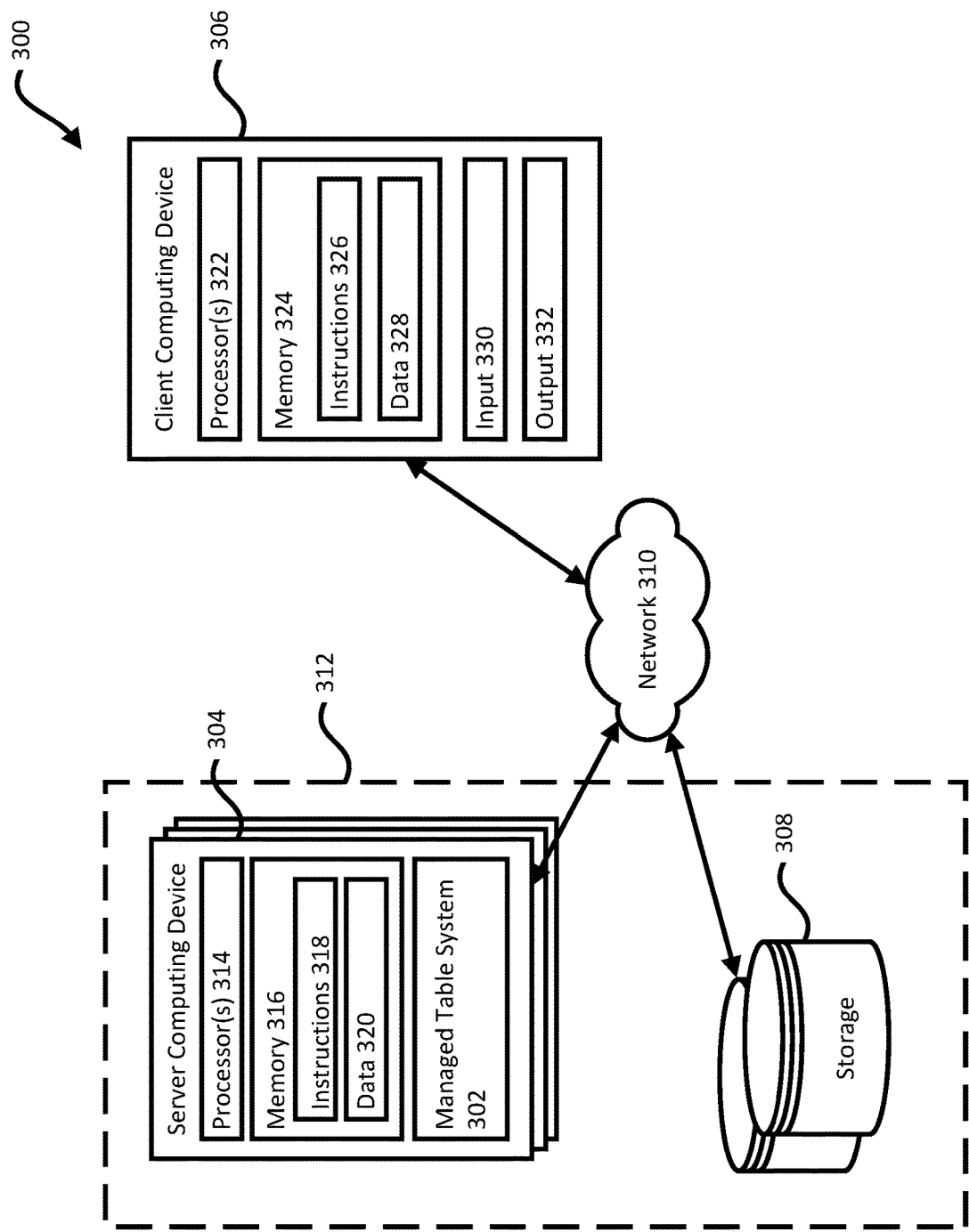
FIG. 3 depicts a block diagram of an example computing environment implementing a managed table system for a cloud storage system according to aspects of the disclosure.

FIG. 3 depicts a block diagram of an example computing environment 300 implementing a managed table system 302 for a cloud storage system. The managed table system 302 can correspond to the managed table system 100 as depicted in FIG. 1. The managed table system 302 can be implemented on one or more devices having one or more processors in one or more locations, such as in a server computing device 304. A client computing device 306 and the server computing device 304 can be communicatively coupled to one or more storage devices 308 over a network 310. The server computing device 304 and the storage devices 308 can form part of a cloud computing system 312 for cloud computing services such as Infrastructure as a Service (IaaS), Platform as a Service (PaaS), and/or Software as a Service (SaaS).

For example, the client computing device 306 may use the cloud computing system 312 as a service that provides software applications, such as accounting, word processing, inventory tracking, fraud detection, file sharing, video sharing, audio sharing, communication, or gaming. As another example, the client computing device 306 can access the cloud computing system 312 as part of one or more operations that employ machine learning, deep learning, and/or artificial intelligence technology to train the software applications. The cloud computing system 312 can provide model parameters that can be used to update machine learning models for the software applications.

The storage devices 308 can be a combination of volatile and non-volatile memory and can be at the same or different physical locations than the computing devices 304, 306. For example, the storage devices 308 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 304 can include one or more processors 314 and memory 316. The memory 316 can store information accessible by the processors 314, including instructions 318 that can be executed by the processors 314. The memory 316 can also include data 320 that can be retrieved, manipulated, or stored by the processors 314. The memory 316 can be a type of non-transitory computer readable medium capable of storing information accessible by the processors 314, such as volatile and non-volatile memory. The processors 314 can include one or more central processing units (CPUs), graphic processing units (GPUs), field-programmable gate arrays (FPGAs), and/or application-specific integrated circuits (ASICs), such as tensor processing units (TPUs).

The instructions 318 can include one or more instructions that when executed by the processors 314, cause the one or more processors to perform actions defined by the instructions 318. The instructions 318 can be stored in object code format for direct processing by the processors 314, or in other formats including interpretable scripts or collections of independent source code modules that are interpreted on demand or compiled in advance. The instructions 318 can include instructions for implementing the managed table system 302. The managed table system 302 can be executed using the processors 314, and/or using other processors remotely located from the server computing device 304.

The data 320 can be retrieved, stored, or modified by the processors 314 in accordance with the instructions 318. The data 320 can be stored in computer registers, in a relational or non-relational database as a table having a plurality of different fields and records, or as JSON, YAML, proto, or XML documents. The data 320 can also be formatted in a computer-readable format such as, but not limited to, binary values, ASCII, or Unicode. Moreover, the data 320 can include information sufficient to identify relevant information, such as numbers, descriptive text, proprietary codes, pointers, references to data stored in other memories, including other network locations, or information that is used by a function to calculate relevant data.

The client computing device 306 can also be configured similarly to the server computing device 304, with one or more processors 322, memory 324, instructions 326, and data 328. The client computing device 306 can also include a client input 330 and a client output 332. The client input 330 can include any appropriate mechanism or technique for receiving input from a client, such as keyboard, mouse, mechanical actuators, soft actuators, touchscreens, microphones, and sensors.

The server computing device 304 can be configured to transmit data to the client computing device 306, and the client computing device 306 can be configured to display at least a portion of the received data on a display implemented as part of the client output 332. The client output 332 can also be used for displaying an interface between the client computing device 306 and the server computing device 304. The client output 332 can alternatively or additionally include one or more speakers, transducers or other audio outputs, a haptic interface or other tactile feedback that provides non-visual and non-audible information to a client of the client computing device 306.

Although FIG. 3 illustrates the processors 314, 322 and the memories 316, 324 as being within the computing devices 304, 306, components described herein, including the processors 314, 322 and the memories 316, 324 can include multiple processors and memories that can operate in different physical locations and not within the same computing device. For example, some of the instructions 318, 326 and the data 320, 328 can be stored on a removable SD card and other instructions within a read-only computer chip. Some or all of the instructions 31, 326 and data 320, 328 can be stored in a location physically remote from, yet still accessible by, the processors 314, 322. Similarly, the processors 314, 322 can include a collection of processors that can perform concurrent and/or sequential operations. The computing devices 304, 306 can each include one or more internal clocks providing timing information, which can be used for time measurement for operations and programs run by the computing devices 304, 306.

The computing devices 304, 306 can be capable of direct and indirect communication over the network 310. The devices 304, 306 can set up listening sockets that may accept an initiating connection for sending and receiving information. The network 310 itself can include various configurations and protocols including the Internet, World Wide Web, intranets, virtual private networks, wide area networks, local networks, and private networks using communication protocols proprietary to one or more companies. The network 310 can support a variety of short- and long-range connections. The short- and long-range connections may be made over different bandwidths, such as 2.402 GHz to 2.480 GHz, commonly associated with the Bluetooth® standard, 2.4 GHz and 5 GHZ, commonly associated with the Wi-Fi® communication protocol; or with a variety of communication standards, such as the LTE® standard for wireless broadband communication. The network 310, in addition or alternatively, can also support wired connections between the computing devices 304, 306, including over various types of Ethernet connection.

Although a single server computing device 304 and user computing device 306 are shown in FIG. 3, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Figure 4:
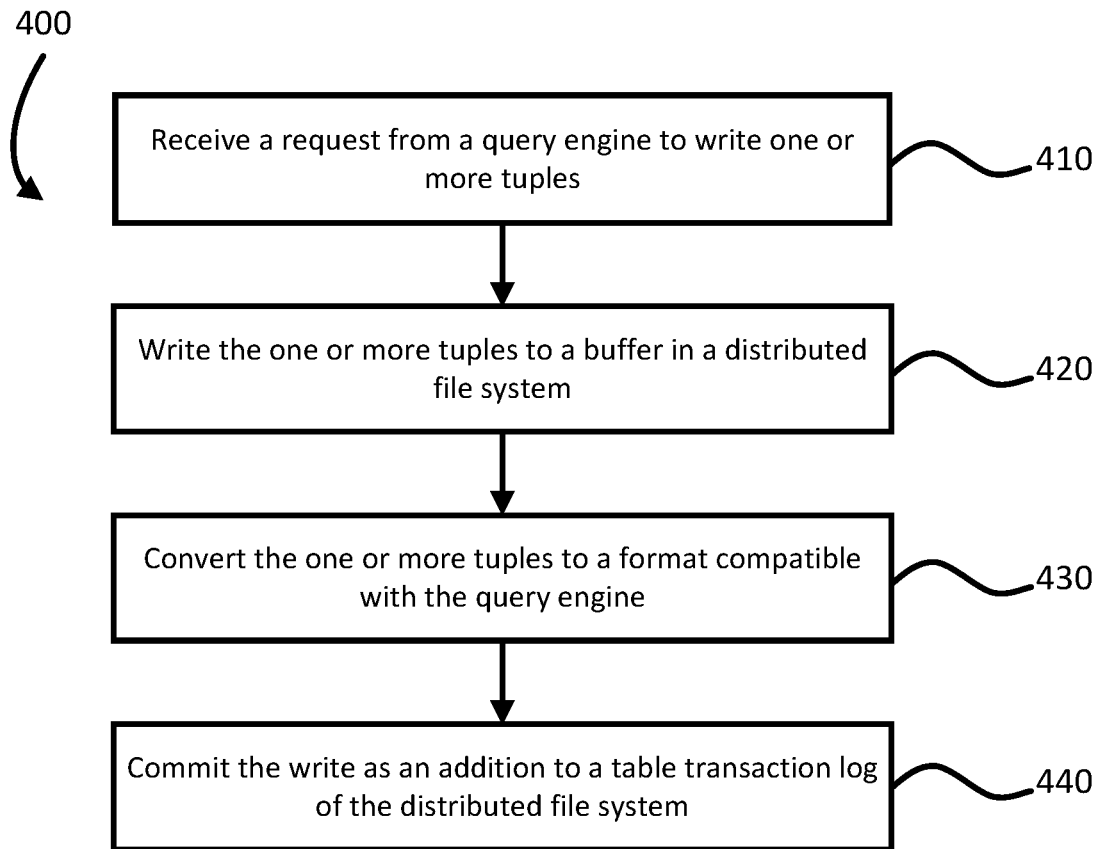
FIG. 4 depicts an example process for processing queries associated with writing table data according to aspects of the disclosure.

FIG. 4 depicts an example process 400 for processing queries associated with writing table data. The example process 400 can be performed on a system of one or more processors in one or more locations, such as the managed table system 100 as depicted in FIG. 1.

As shown in block 410, the managed table system 100 can be configured to receive a request from a query engine to write one or more tuples. The query engine can be a data lake query engine, such as an open-source engine.

As shown in block 420, the managed table system 100 can be configured to write the one or more tuples to a storage in a distributed file system. The storage can be a write-optimized storage having a row-oriented format for storing the tuples. The distributed file system can be an appendable distributed file system.

As shown in block 430, the managed table system 100 can be configured to convert the tuples to one or more data files in a format compatible with the query engine. The managed table system 100 can convert the tuples to a read-optimized format having a columnar-oriented format. The managed table system 100 can periodically or continually convert the tuples based on how fast the tuples are ingested. The managed table system 100 can be further configured to store the one or more data files in the cloud storage compatible with the query engine. Since table data can represent a union of data files stored in the cloud storage and storage, the tuples can be visible after a write, even if not converted yet.

As shown in block 440, the managed table system 100 can commit the write as an addition and/or deletion to a table transaction log in the distributed file system. For example, the commit can occur exactly once. The managed table system 100 can periodically or continually compact the transaction log into columnar baselines based on how fast the additions and/or deletions occur. The columnar baselines can be read-optimized and in a format compatible with the query engine. The columnar baselines can include column-level metadata.

Figure 5:
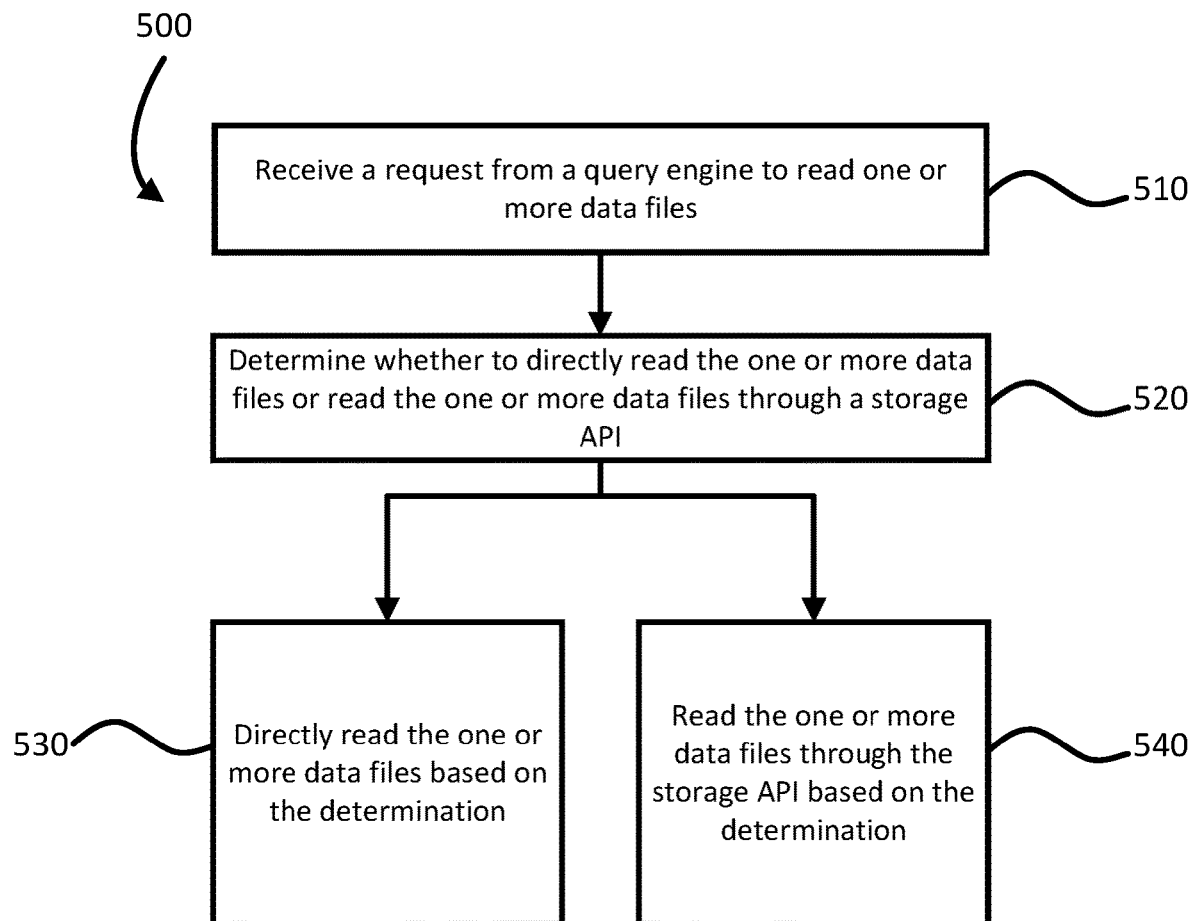
FIG. 5 depicts an example process for processing queries associated with reading table data according to aspects of the disclosure.

FIG. 5 depicts an example process 500 for processing queries associated with reading table data. The example process 500 can be performed on a system of one or more processors in one or more locations, such as the managed table system 100 as depicted in FIG. 1.

As shown in block 510, the managed table system 100 can be configured to receive a request from a query engine to read one or more data files in a cloud storage in a format compatible with the query engine. The query engine can be a data lake query engine, such as an open-source engine.

As shown in block 520, the managed table system 100 can be configured to determine whether to read the one or more data files directly or read the one or more data files through a storage API. The managed table system 100 can determine how to read the one or more data files based on instructions included in the request.

In response to the determination, as shown in block 530, the managed table system 100 can be configured to directly read the one or more data files. The managed table system 100 can directly access the one or more data files in the cloud storage using an open metadata view engine. Based on the direct file access, FGACs may not be enforced. Further, based on eventual consistency, recently streamed tuples in the write-optimized storage may not be visible.

In response to the determination, as shown in block 540, the managed table system 100 can be configured to read the one or more data files through the storage API. The storage API can enforce FGACs using logical metadata and offer strong consistency since the storage API can access a union of data files between the cloud storage and the write-optimized storage.

Figure 6:
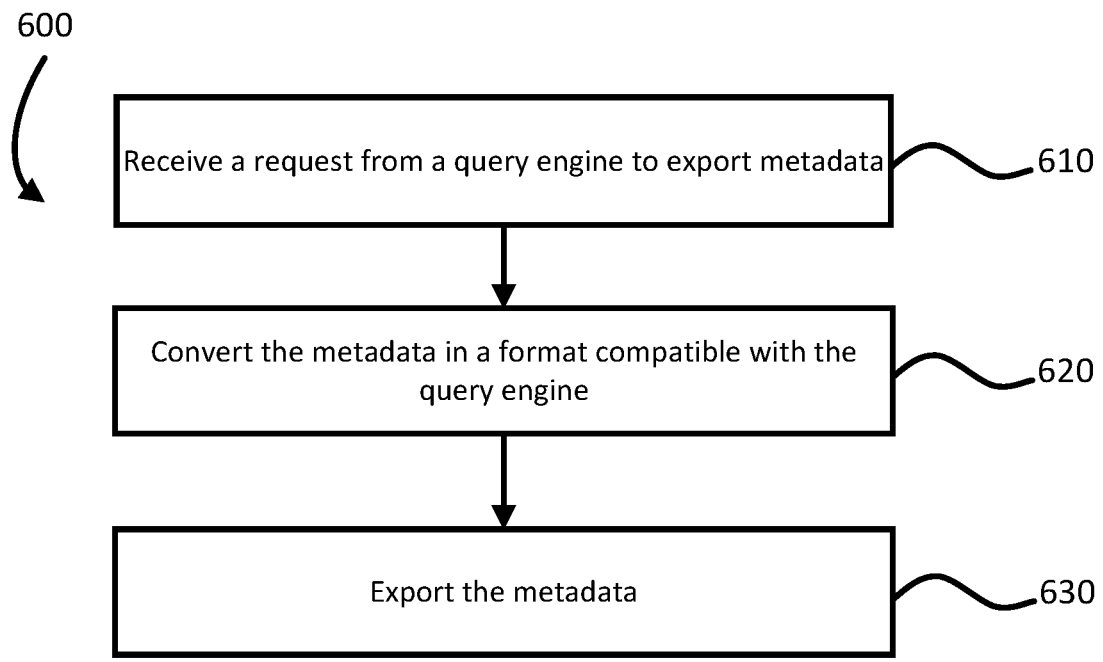
FIG. 6 depicts an example process for processing queries associated with exporting metadata according to aspects of the disclosure.

FIG. 6 depicts an example process 600 for processing queries associated with exporting metadata. The example process 600 can be performed on a system of one or more processors in one or more locations, such as the managed table system 100 as depicted in FIG. 1.

As shown in block 610, the managed table system 100 can be configured to receive a request from a query engine to export metadata associated with table data in a cloud storage in a format compatible with the query engine. The query engine can be a data lake query engine, such as an open-source engine.

As shown in block 620, the managed table system 100 can be configured to convert the metadata to a format compatible with the query engine. The managed table system 100 can convert the table transaction log to a format compatible with the query engine. The managed table system 100 can convert the metadata to a particular format based on the format of the query received from the query engine.

As shown in block 630, the managed table system 100 can be configured to export the metadata. The managed table system 100 can store the table transaction log in the cloud storage compatible with the query engine.

Figure 7:
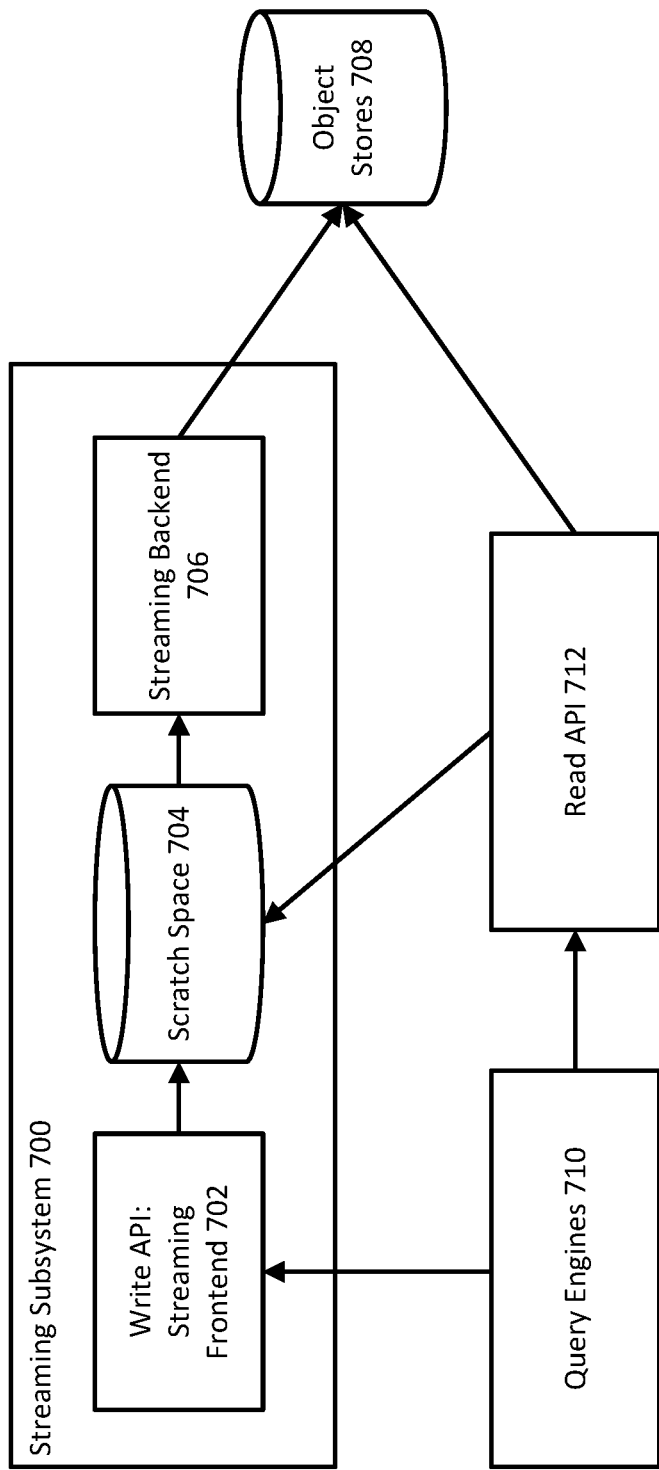
FIG. 7 depicts a block diagram of an example streaming system that combines scratch space storing write-optimized data with an object store storing read-optimized data according to aspects of the disclosure.

FIG. 7 depicts a block diagram of an example streaming subsystem 700. The example streaming subsystem 700 can be included as part of the managed table system 100 as depicted in FIG. 1. The streaming subsystem 700 can be implemented on one or more computing devices in one or more locations. The streaming subsystem 700 can include a write API 702 as part of a streaming frontend, a scratch space 704, and a streaming backend 706. The write API 702 can correspond to the storage API 122 as depicted in FIG. 1. The scratch space 704 can be included as part of the distributed file system 118 as depicted in FIG. 1. For example, the scratch space 704 can correspond to the write-optimized buffer 206 as depicted in FIG. 2. The streaming backend 706 can correspond to the data management engine 210 as depicted in FIG. 2.

The streaming subsystem 700 can provide higher throughput streaming on object stores 708 without running into the small file problem. The small file problem may refer to creating new files right after a few records are streamed, resulting in tables having a lot of tiny files, which add significant time overhead for file listing and per-file metadata overhead. These overheads limit streaming throughput and lower query performance when data is read. The object stores 708 can correspond to the cloud storage 106 as depicted in FIG. 1. The streaming subsystem 700 can utilize the scratch space 704 to bulk convert and output data in various formats, such as open source formats, to the cloud object stores 708.

The streaming subsystem 700 can receive queries from various query engines 710. The query engines 710 can correspond to the data lake query engines 102 and/or data warehouse query engines 104 as depicted in FIG. 1. Based on the queries, the streaming subsystem 700 ingests data using the write API 702 and stores the data in a durable write-optimized storage, such as being stored using row-oriented format in the scratch space 704 of a distributed file system that supports appends. The write-optimized storage can be replicated to multiple locations for high availability. The streaming subsystem 700 can bulk convert data from one or more intermediate files in the scratch space 704 to a final file for storage in the object stores in various file formats. The streaming subsystem 700 can bulk convert the data using the streaming backend 706. Metadata for the newly created object store files can be persisted in the managed table system. The query engines 710 can read data using a read API 712 immediately after a write confirmation, as the data to be read can include data from both the object stores 708 and the scratch space 704.

The streaming subsystem 700 allows for real-time insertion of row level information into object store tables via the write API 702, such as row-by-row, in rowsets, and/or in batches. The information can be inserted, updated, and/or deleted via the write API 702 as well. The streaming subsystem 700 allows for streamed data to be immediately queried via the query engines 710 using the read API 712 after confirmation of delivery of the streamed data, even before final materialization in the object stores 708.

The managed table system can represent the union of tuples in immutable files stored in cloud object stores as well as internally stored high throughput write optimized storage. Atomicity guarantees can be offered by the conversion of files in the write optimized storage to immutable files in the cloud object stores by performing transactional commits that invalidate the write-optimized files and add read-optimized files to the managed table system. The atomicity guarantees can include exactly once delivery, where each streamed record is guaranteed to be added to the table once as well as strong read-after-write semantics, where streamed data is immediately visible to queries after write acknowledgement or commit.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, which is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" or "data processing system" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for processing queries, comprising:
   receiving, by one or more processors, a first request from a query engine to read one or more data files;
   determining, by the one or more processors, based on instructions in the first request, whether to read the one or more data files through a storage application programming interface (API) or directly from read-optimized cloud storage;
   selecting, by the one or more processors, based on the instructions indicating to read the one or more data files through the storage API, to read the one or more data files through the storage API;
   retrieving, by the one or more processors, the one or more data files from either the read-optimized cloud storage or a write-optimized buffer by determining whether the one or more data files are stored in the read-optimized cloud storage or the write-optimized buffer using column-level metadata stored in an appendable distributed file system separate from the read-optimized cloud storage;
   reading, by the one or more processors, the one or more data files in response to the first request from the query engine;
   receiving, by the one or more processors, a second request to read one or more additional data files;
   selecting, by the one or more processors, to directly read the one or more additional data files from the read-optimized cloud storage based on instructions in the second request;
   retrieving, by the one or more processors, the one or more additional data files from the read-optimized cloud storage using a metadata snapshot of the column-level metadata; and
   reading, by the one or more processors, the one or more additional data files in response to the second request.

2. The method of claim 1, further comprising exporting, by the one or more processors, the metadata stored in the appendable distributed file system to the read-optimized cloud storage in one or more formats compatible with the query engine.

3. The method of claim 2, wherein the exporting is automatically triggered in response to one or more additions to a table transaction log stored in the appendable distributed file system.

4. The method of claim 3, wherein the one or more additions to the table transaction log are in response to requests to write one or more data files to the read-optimized cloud storage.

5. The method of claim 1, wherein the column-level metadata is stored in a table transaction log in the appendable distributed file system.

6. The method of claim 5, wherein the table transaction log is periodically compacted into a read-optimized format compatible with the query engine.

7. The method of claim 1, wherein the query engine comprises a data lake query engine or a data warehouse query engine.

8. The method of claim 1, further comprising performing, by the one or more processors, one or more maintenance tasks based on the column-level metadata in the distributed file system.

9. The method of claim 8, wherein the one or more maintenance tasks comprise at least one of garbage collection, data file merging, data file splitting, or data file reclustering.

10. A system comprising:
    one or more processors; and
    one or more storage devices coupled to the one or more processors and storing instructions that, when executed by the one or more processors, cause the one or more processors to perform operations for processing queries, the operations comprising:
       receiving a first request from a query engine to read one or more data files;
       determining, based on instructions in the first request, whether to read the one or more data files through a storage application programming interface (API) or directly from read-optimized cloud storage;
       selecting, based on the instructions indicating to read the one or more data files through the storage API, to read the one or more data files through the storage API;
       retrieving the one or more data files from either the read-optimized cloud storage or a write-optimized buffer by determining whether the one or more data files are stored in the read-optimized cloud storage or the write-optimized buffer using column-level metadata stored in an appendable distributed file system separate from the read-optimized cloud storage;
       reading the one or more data files in response to the request from the query engine;
       receiving a second request to read one or more additional data files;
       selecting to directly read the one or more additional data files from the read-optimized cloud storage based on instructions in the second request;
       retrieving the one or more additional data files from the read-optimized cloud storage using a metadata snapshot of the column-level metadata; and
       reading the one or more additional data files in response to the second request.

11. The system of claim 10, wherein the operations further comprise exporting the column-level metadata stored in the appendable distributed file system to the read-optimized cloud storage in one or more formats compatible with the query engine.

12. The system of claim 11, wherein the exporting is automatically triggered in response to one or more additions to a table transaction log stored in the appendable distributed file system.

13. The system of claim 12, wherein the one or more additions to the table transaction log are in response to requests to write one or more data files to the read-optimized cloud storage.

14. The system of claim 10, wherein the column-level metadata is stored in a table transaction log in the appendable distributed file system.

15. The system of claim 14, wherein the table transaction log is periodically compacted into a read-optimized format compatible with the query engine.

16. The system of claim 10, wherein the operations further comprise performing one or more maintenance tasks based on the column-level metadata in the distributed file system.

17. A non-transitory computer readable medium for storing instructions that, when executed by one or more processors, cause the one or more processors to perform operations for processing queries, the operations comprising:
   receiving a first request from a query engine to read one or more data files;
   determining, based on instructions in the first request, whether to read the one or more data files through a storage application programming interface (API) or directly from read-optimized cloud storage;
   selecting, based on the instructions indicating to read the one or more data files through the storage API, to read the one or more data files through the API;
   retrieving the one or more data files from either the read-optimized cloud storage or a write-optimized buffer by determining whether the one or more data files are stored in the read-optimized cloud storage or the write-optimized buffer using column-level metadata stored in an appendable distributed file system separate from the read-optimized cloud storage;
   reading the one or more data files in response to the request from the query engine;
   receiving a second request to read one or more additional data files;
   selecting to directly read the one or more additional data files from the read-optimized cloud storage based on instructions in the second request;
   retrieving the one or more additional data files from the read-optimized cloud storage using a metadata snapshot of the column-level metadata; and
   reading the one or more additional data files in response to the second request.

* * * * *